Patented Sept. 28, 1948

2,450,117

UNITED STATES PATENT OFFICE 2,450,117

PREPARATION OF β-LACTONES

John R. Caldwell, Kingsport, Tenn., assignor to Eastman Kodak Company, Rochester, N. Y., a corporation of New Jersey No Drawing. Application July 23, 1947, Serial No. 763,150

20 Claims. (Cl. 260—344)

This invention relates to a process for preparing lactones of β-hydroxycarboxylic acids by reacting a ketene with a carbonyl-containing compound.

Staudinger first showed that keto-ketenes, such as diphenyl ketene, react with aldehydes and ketones to give lactones (Annalen 384 (1911) pages 38–135, and Annalen 380 (1911) page 243), and with unsaturated ketones to give unsaturated hydrocarbons (Annalen 401 (1913) page 263).

It has long been known that aldo-ketenes, such as methyl ketene, are relatively unstable and polymerize readily to the dimer under ordinary conditions of temperature and pressure. When an aldo-ketene is reacted with a carbonyl-containing compound in the absence of a catalyst no condensation between the ketene and carbonyl-containing compound occurs. Instead, the ketene polymerizes to the dimer. When an aldehyde is used as the carbonyl-containing compound, the dimer is formed, as mentioned above, reacts with the aldehyde to produce an unsaturated ketone, as shown by Boese in U. S. Patent No. 2,108,427, dated February 15, 1938. According to the process of my invention, however, both keto- and aldo-ketenes may be reacted with aldehydes, ketones, diketones, or keto-esters, hereinafter referred to as carbonyl-containing compounds, to produce β-lactones, i. e. lactones of β-hydroxy carboxylic acids.

Although it is known that in the case of some carbonyl-containing compounds, a β-lactone may be produced by reacting ketene (CH₂=C=O) with said carbonyl-containing compound, the reaction takes place to such a slight extent as to be of no practical value, at most yields of 5 to 10% of β-propionolactone being obtained when ketene is reacted with formaldehyde. For example Kung in U. S. Patent 2,356,459, dated August 22, 1944, has shown that β-lactones may be produced by reacting ketene with aldehydes or ketones. The Friedel-Crafts type catalysts which are employed by Kung, however, have the disadvantage of forming complexes with the products produced and separation in some instances becomes quite difficult.

It is therefore an object of my invention to provide a process for preparing β-lactones by reacting a ketene with a carbonyl-containing compound whereby yields of 75 to 85% may be attained.

A further object of my invention is to provide a catalyst for the reaction between a ketene and a carbonyl-containing compound which avoids the formation of catalyst-product complexes.

Still another object of my invention is to provide a process for preparing β-lactones which are valuable intermediates for the preparation of unsaturated acids, esters, amides and nitriles. Other objects will become apparent from a consideration of the following examples.

According to my process, a ketene is reacted with a carbonyl-containing compound such as aldehydes, ketones, diketones, or keto-esters in the presence of a catalyst consisting essentially of zinc thiocyanate.

Aldehydes which may be utilized in my invention are represented by the formula:

where R stands for hydrogen; an alkyl radical, such as methyl, ethyl, propyl, butyl, secondary butyl and tertiary butyl radicals, i. e. an alkyl group of the formula $C_nH_{2n+1}$ where $n$ is a positive integer of 1 to 4; an aralkyl radical, such as benzyl or betaphenyl ethyl; and an aryl group such as phenyl, ortho-, meta-, and para-tolyl, i. e., an aryl radical of the benzene series having 6 to 10 carbon atoms. Aldehydes where R is hydrogen or methyl are preferred for the purpose of my invention. However, other aldehydes may likewise be employed.

Ketones which may be employed in my process have the formula:

wherein $R'$ and $R^2$ represent the same or different alkyl groups, such as methyl, ethyl, propyl, butyl, secondary and tertiary butyl, i. e., an alkyl radical having the formula $C_nH_{2n+1}$, where $n$ is a positive integer from 1 to 4; an aryl group, such as phenyl, ortho-, meta-, and para-tolyl, i. e., an aryl group of the benzene series having 6 to 10 carbon atoms or an aralkyl group, such as benzyl or beta-phenyl ethyl. Acetone is the preferred ketone due to its commercial availability. However, other ketones may likewise be used expeditiously.

The diketones which I prefer to use in my process have the formula:

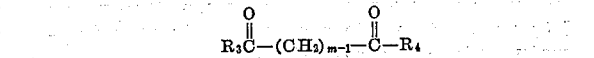

wherein $R_3$ and $R_4$ represent an alkyl radical, such as methyl, ethyl, propyl, isopropyl, butyl, secondary and tertiary butyl, i. e., an alkyl radical of the formula $C_nH_{2n+1}$ wherein $n$ is a positive integer of 1 to 4, and $m$ represents a positive integer of 1 to 3.

Suitable keto-esters which may be used have the formula:

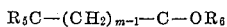

wherein $R_5$ and $R_6$ represent the same or different alkyl radicals, such as methyl, ethyl, propyl, isopropyl, butyl, secondary and tertiary butyl, and $m$ is a positive integer from 1 to 3.

Typical carbonyl compounds which may be used in practicing my invention are formaldehyde, acetaldehyde, propionaldehyde, butyraldehyde, isobutyraldehyde, benzaldehyde, phenyl acetaldehyde, beta-phenyl propionaldehyde, tolyl aldehyde, acetone, diethyl ketone, methyl ethyl ketone, methyl propyl ketone, methyl butyl ketone, acetophenone, benzophenone, methyl benzyl ketone, para-methyl acetophenone, biacetyl, acetyl acetone, hexandione 2,4, methyl pyruvate, ethyl pyruvate, methyl and ethyl acetoacetates, methyl and ethyl levulinates and the like. In addition, compounds not set forth in the above formulae, such as crotonaldehyde, furfuraldehyde, methyl cyclohexyl ketone, methyl isopropenyl ketone, and other olefinic ketones or aldehydes likewise may be employed.

Ketenes which may be employed in my invention have the formula:

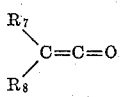

wherein $R_7$ and $R_8$ represent hydrogen, the same or different alkyl radicals, such as methyl, ethyl, propyl, isopropyl, butyl, secondary and tertiary butyl, i. e., an alkyl radical having 1 to 4 carbon atoms, an aryl radical, such as phenyl, ortho-, meta-, and para-tolyl, i. e., an aryl radical of the benzene series having 6 to 10 carbon atoms or an aralkyl radical, such as benzyl, beta-phenyl ethyl and the like. Ketenes where $R_7$ and $R_8$ are hydrogen or a methyl radical represent a preferred group.

The catalyst which I use in my process is zinc thiocyanate. This catalyst may conveniently be prepared by evaporating an aqueous solution of zinc thiocyanate to dryness on a steam bath, and thereafter continuing the heating of the crystalline residue for 8 hours at 140° C. to insure the removal of any water of hydration. The catalyst thus attained is essentially anhydrous and ready for immediate use in my process. The amount of catalyst used may vary from 0.01% to 2% by weight, based on the carbonyl-containing compound employed. Generally, for practical purposes I prefer to use an amount of catalyst from 0.1% to 0.5% by weight, based on the carbonyl-containing compound employed.

The temperature of my process may likewise be varied according to the type of compound being reacted. Care should be taken to avoid too rapid an elevation of temperature since beta-lactones readily lose carbon dioxide and form unsaturated hydrocarbons. The temperature may be as low as −40° C. or as high as 50° C., but generally a temperature within the range of 0° C. to 30° C. is preferred. Formaldehyde, for example, will react with ketene within the temperature range of 0° to 50° C. while acetone reacts at a temperature of from 5° to 40° C.

Solvents, such as benzene, toluene, heptane, dioxane, ethyl ether, isopropyl ether, carbon tetrachloride, carbon bisulfide and the like, may or may not be used. In order to avoid separation of a solvent after the reaction has been completed, it is preferred to use a solution of the lactone produced from a previous run.

When an aldehyde is the carbonyl compound to be reacted, a more uniform process usually results if the ketene and aldehyde, in gaseous form and in substantially equimolar quantities, are passed into a stirred solution of the zinc thiocyanate in the lactone, while in other cases the gaseous ketene may be passed into a stirred solution of the zinc thiocyanate catalyst, carbonyl compound, and lactone. However, it is not necessary always to use a gaseous aldehyde or a liquid ketone, diketone, or keto-ester. The temperature at which the condensation takes place is the critical factor to be considered and it is, therefore, to be understood that my process may be batchwise or continuous, or may be performed in the liquid or vapor phase. When a continuous process is used, any of the conventional apparatus available to the art for such purposes may be employed. The catalyst may be supported on some inert solid carrier therefor, and the flow of reactants may be counter-current or otherwise. I prefer, however, when using a continuous process to carry out my invention in the manner described in the copending application of Hugh J. Hagemeyer and Delmer C. Cooper, Serial No. 660,286, filed April 6, 1946. The pressures may be atmospheric or superatmospheric. If the ketene has been secured by the pyrolysis of acetic acid, it may be advantageous to carry out the process in a scrubber-type reactor. Such a process is described in the copending application of Herbert G. Stone, Serial No. 660,285, filed April 6, 1946.

In some instances the beta-lactone may be distilled directly from the neutralized reaction mixture. However, when the lactone of an olefinic-carbonyl compound has been prepared, ordinarily such a mode of separation cannot be realized even under diminished pressures, since decarboxylization of the formed lactone may follow. Here an extraction or separation by gravity is indicated. When the lactone of a low-boiling carbonyl compound, such as formaldehyde, acetaldehyde, etc. has been formed, the lactone may be separated by flash distillation, i. e., passing the warm reaction mixture into a heated chamber under reduced pressure, the low-boiling components thereof being distilled off, and a residue consisting primarily of the desired lactone remaining. The lactone may then be further purified by flash distillation under reduced pressures, or used without purification as a solvent for a subsequent condensation. This lactone solution need not correspond to the lactone being produced, however for practical purposes it is preferred to use a lactone solution which corresponds to the lactone being formed. When desired, the lactone solvent and formed lactone need not correspond, if the lactone solution may be separated from the formed lactone by fractional distillation or if the mixture of lactones is intended to be utilized without purification in the preparation of other compounds such as synthetic resins, polymers and the like.

The following examples are given to further characterize my invention:

*Example I.—Preparation of beta-propionolactone (lactone of beta-hydroxypropionic acid)*

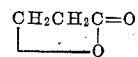

The gaseous ketene utilized in this example is conveniently prepared by the pyrolysis of acetone with an electrically heated nichrome coil. The formaldehyde is obtained by heating paraformaldehyde at a temperature of from 140° to 160° C.

Gaseous ketene and gaseous formaldehyde are mixed in approximately equimolar ratios and are led into a stirred solution of .2 g. zinc thiocyanate in 50 g. beta-propionolactone, maintained at a temperature of 0°–15° C. The passage of the gaseous reactants into the catalyst solution is continued until 1.0 g. moles of each reactant has been added. The reaction mixture is then stirred with .5 g. sodium carbonate in 2 cc. water to neutralize the catalyst. The product is subjected to a high vacuum flash distillation to remove the catalyst. After re-distilling, a 70 to 80% yield of beta-propionolactone boiling at 37 to 40° C., 4 mm. pressure is obtained.

*Example II.—Preparation of beta-butyrolactone (lactone of beta-hydroxybutyric acid)*

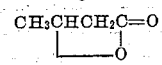

Zinc thiocyanate (0.2 g.) is dispersed in 50 cc. dioxane and the mixture is stirred at 0–10° C. Acetaldehyde is dropped into the mixture at the rate of 0.8–1.0 mol per hour while gaseous ketene is introduced at the same rate. The reaction is continued until 1 mol of reactants have been added. The catalyst is neutralized by adding 0.5 g. sodium carbonate dissolved in 2 cc. water. The product is distilled in vacuum to give a 70–80% yield of beta-butyrolactone B. Pt. 56°/10 mm. The lactone was identified by catalytic hydrogenation to butyric acid.

*Example III.—Preparation of beta-methyl-beta-butyrolactone (lactone of beta-hydroxy-isovaleric acid)*

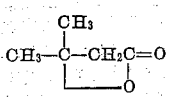

Two hundred and fifty cc. of acetone containing 0.5 g. zinc thiocyanate are stirred at 25–30° C. and 1 mol of gaseous ketene is passed in. Most of the acetone is removed under vacuum at 25° and the residue is distilled in vacuum to give a 70–75% yield of beta-methyl-beta butyrolactone. The lactone was identified by hydrogenating to beta-methyl butyric acid.

*Example IV.—Preparation of beta-carboethoxymethyl-beta-butyrolactone*

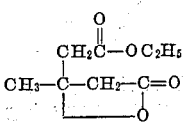

200 g. ethyl acetoacetate containing 1 g. zinc thiocyanate is stirred at 25–30° C. and 1 mol ketene is passed in. The catalyst is neutralized by adding 0.5 g. sodium carbonate in 2 cc. water. The product is distilled to give a 35–40% yield of 3-methyl-3-butenoic acid ethyl ester, B. Pt. 54.5°/20 mm. The acid was identified by catalytic hydrogenation to beta-methyl butyric acid.

*Example V.—Preparation of beta-acetylmethyl-beta-butyrolactone*

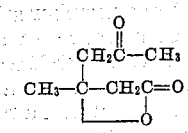

200 g. acetyl acetone containing 1 g. zinc thiocyanate are stirred at 10–15° C. and 1 mol ketene is passed in. After the catalyst has been neutralized, the product is distilled to give di-isopropenyl methane, B. Pt. 88°/735 mm., and 2 methylpentene-1-one-4 B. Pt. 127°/735 mm.

Similarly other carbonyl-containing compounds may be used to prepare beta-lactones. For example, when butyraldehyde replaces the formaldehyde of Example I or the acetaldehyde of Example II, beta-caproaldehyde having the formula:

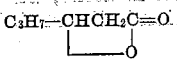

is produced. When ketene is passed into a solution of methyl acetoacetate in which 0.2 g. of zinc thiocyanate has been dissolved, beta-carbomethoxymethyl-beta-butyrolactone having the formula:

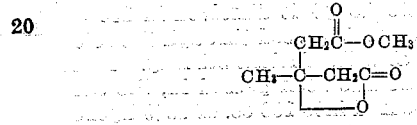

is formed. In the manner described in Example V, ketene, when reacted with propionyl acetone, produces beta-propionylmethyl-beta-butyrolactone having the formula:

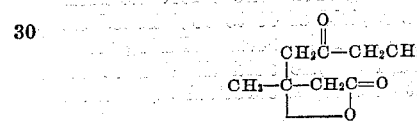

while acetophenone gives an excellent yield of beta-phenyl-beta-butyrolactone having the formula:

To show that my process is likewise applicable to unsaturated or olefinic carbonyl-containing compounds, ketene is passed into a solution of crotonaldehyde in which zinc thiocyanate has been dissolved. The lactone of beta-hydroxy-4-hexenoic acid was obtained having the formula:

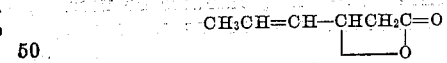

Furfurylaldehyde produces the lactone of beta-(2-furfuryl)-beta-hydroxypropionic acid having the formula:

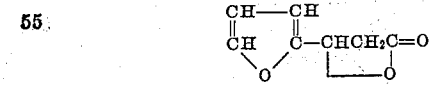

when ketene is passed into a solution of furfurylaldehyde and zinc thiocyanate.

If desired, in lieu of securing the beta-lactone directly from the neutralized reaction mixture, it is possible to hydrolyze the beta-lactone to a hydroxy carboxylic acid and subsequently dehydrate this acid to its corresponding unsaturated derivative. For example:

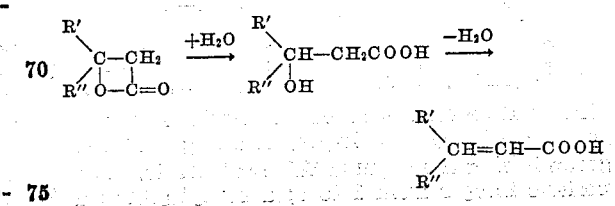

where R' and R" represent hydrogen or a hydrocarbon radical.

*Example VI.—Preparation of beta, beta-dimethyl acrylic acid*

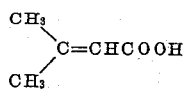

In this example, the lactone was not separated from the reaction mixture, but was hydrolyzed by steam distillation to the unstable beta-hydroxy acid:

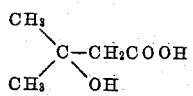

which was then dehydrated to the dimethyl acrylic acid.

Zinc thiocyanate (.5 g.) is dissolved in 150 cc. of acetone and ketene is passed through the solution at 20 to 30° C. with efficient stirring. After one mole of ketene has been passed in, the acetone solution is poured into 100 cc. of 15% hydrochloric acid. The mixture is then steam distilled. After the acetone and most of the water have been removed, crystals of dimethyl acrylic acid begin to form in the condenser. The product is collected by extracting from the water solution with ether to give a yield of 40 to 50% based on the ketene consumed. After recrystallizing from water, the dimethyl acrylic acid titrated to an equivalent weight of 99.5; theoretical equivalent weight was 100.

*Example VII.—Preparation of beta-ethylcrotonic acid*

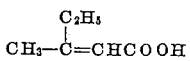

Methyl ethyl ketone is treated with ketene using zinc thiocyanate as catalyst as described in Example VI above. A yield of 50 to 60% beta ethyl crotonic acid is obtained based on the amount of ketene consumed.

The beta-lactones of my invention, as has been mentioned above, are valuable intermediates in the preparation of unsaturated acids, esters, amides, or nitriles. They may likewise be used in the preparation of synthetic resins, polymers, and rubbers.

I claim:

1. A process for preparing a beta-lactone which comprises reacting at a temperature of from —40° C. to 50° C. a ketene having the formula:

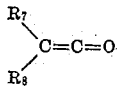

wherein $R_7$ and $R_8$ each represents a member selected from the group consisting of a hydrogen atom, a methyl group, an ethyl group and a phenyl ($C_6H_5$—) group, with a carbonyl compound selected from the group represented by the four general formulas:

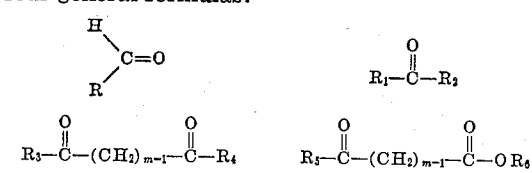

wherein R represents a member selected from the group consisting of a hydrogen atom; an alkyl group having the formula $C_nH_{2n+1}$ wherein $n$ is a positive integer from 1 to 4; a benzyl group; a beta-phenylethyl group; and a phenyl ($C_6H_5$—) group, $R_1$ and $R_2$ each represents a member selected from the group consisting of alkyl groups having the formula $C_nH_{2n+1}$ wherein $n$ is a positive integer from 1 to 4; a benzyl group; a beta-phenylethyl group; and a phenyl ($C_6H_5$—) group, $R_3$, $R_4$, $R_5$, and $R_6$ each represents an alkyl group having the formula $C_nH_{2n+1}$, wherein $n$ is a positive integer from 1 to 4, and $m$ represents a positive integer from 1 to 3, in the presence of zinc thiocyanate.

2. A process for preparing a beta-lactone which comprises reacting at a temperature of from —40° C. to 50° C. a ketene having the formula:

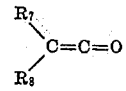

wherein $R_7$ and $R_8$ each represents a member selected from the group consisting of a hydrogen atom, a methyl group, an ethyl group and a phenyl ($C_6H_5$—) group, with a carbonyl compound selected from the group represented by the four general formulas:

wherein R represents a member selected from the group consisting of a hydrogen atom; an alkyl group having the formula $C_nH_{2n+1}$ wherein $n$ is a positive integer from 1 to 4; a benzyl group; a beta-phenylethyl group; and a phenyl ($C_6H_5$—) group, $R_1$ and $R_2$ each represents a member selected from the group consisting of alkyl groups having the formula $C_nH_{2n+1}$ wherein $n$ is a positive integer from 1 to 4; a benzyl group; a beta-phenylethyl group; and a phenyl ($C_6H_5$—) group, $R_3$, $R_4$, $R_5$, and $R_6$ each represents an alkyl group having the formula $C_nH_{2n+1}$ wherein $n$ is a positive integer from 1 to 4, and $m$ represents a positive integer from 1 to 3 in the presence of from 0.01% to 2% by weight, based on the carbonyl compound, of zinc thiocyanate, and in the presence of an inert solvent.

3. A process for preparing a beta-lactone which comprises reacting at a temperature of from —40° C. to 50° C. a ketene having the formula:

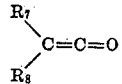

wherein $R_7$ and $R_8$ each represents a member selected from the group consisting of a hydrogen atom, a methyl group, an ethyl group and a phenyl ($C_6H_5$—) group, with a carbonyl compound selected from the group represented by the four general formulas:

wherein R represents a member selected from the group consisting of a hydrogen atom; an alkyl group having the formula $C_nH_{2n+1}$ wherein $n$ is a positive integer from 1 to 4; a benzyl group; a beta-phenylethyl group; and a phenyl ($C_6H_5$—) group, $R_1$ and $R_2$ each represents a member selected from the group consisting of alkyl groups having the formula $C_nH_{2n+1}$ wherein $n$ is a positive integer from 1 to 4; a benzyl group; a beta-phenylethyl group; and a phenyl ($C_6H_5$—) group, $R_3$, $R_4$, $R_5$, and $R_6$ each represents an alkyl group having the formula $C_nH_{2n+1}$ wherein $n$ is a positive integer from 1 to 4, and $m$ represents a positive integer from 1 to 3, in the presence of from 0.01% to 2% by weight, based on the carbonyl compound, of zinc thiocyanate, and in the presence of a beta-lactone which corresponds to the lactone being formed.

4. A process for preparing a beta-lactone which comprises reacting at a temperature of from —40° C. to 50° C. ketene ($CH_2$=C=O) with a carbonyl compound selected from the group represented by the four general formulas:

 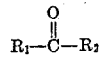

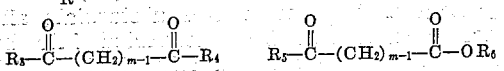

wherein R represents a member selected from the group consisting of a hydrogen atom; an alkyl group having the formula $C_nH_{2n+1}$ wherein $n$ is a positive integer from 1 to 4; a benzyl group; a beta-phenylethyl group; and a phenyl ($C_6H_5$—) group, $R_1$ and $R_2$ each represents a member selected from the group consisting of alkyl groups having the formula $C_nH_{2n+1}$ wherein $n$ is a positive integer from 1 to 4; a benzyl group; a beta-phenylethyl group; and a phenyl ($C_6H_5$—) group, $R_3$, $R_4$, $R_5$, and $R_6$ each represents an alkyl group having the formula $C_nH_{2n+1}$ wherein $n$ is a positive integer from 1 to 4, and $m$ represents a positive integer from 1 to 3, in the presence of zinc thiocyanate.

5. A process for preparing a beta-lactone which comprises reacting at a temperature of from —40° C. to 50° C. ketene ($CH_2$=C=O) with a carbonyl compound selected from the group represented by the four general formulas:

 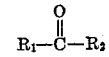

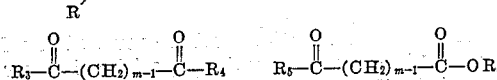

wherein R represents a member selected from the group consisting of a hydrogen atom; an alkyl group having the formula $C_nH_{2n+1}$ wherein $n$ is a positive integer from 1 to 4; a benzyl group; a beta-phenylethyl group; and a phenyl ($C_6H_5$—) group, $R_1$ and $R_2$ each represents a member selected from the group consisting of alkyl groups having the formula $C_nH_{2n+1}$ wherein $n$ is a positive integer from 1 to 4; a benzyl group; a beta-phenylethyl group; and a phenyl ($C_6H_5$—) group, $R_3$, $R_4$, $R_5$, and $R_6$ each represents an alkyl group having the formula $C_nH_{2n+1}$ wherein $n$ is a positive integer from 1 to 4, and $m$ represents a positive integer from 1 to 3, in the presence of from 0.01% to 2% by weight, based on the carbonyl compound, of zinc thiocyanate, and in the presence of an inert solvent.

6. A process for preparing a beta-lactone which comprises reacting at a temperature of from —40° C. to 50° C. a ketene having the formula:

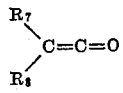

wherein $R_7$ and $R_8$ each represents a member selected from the group consisting of a hydrogen atom, a methyl group, an ethyl group, and a phenyl ($C_6H_5$) group, with an aldehyde represented by the formula:

wherein R represents an alkyl group of the formula $C_nH_{2n+1}$ where $n$ is a positive integer of 1 to 4, in the presence of from 0.01% to 2% by weight, based on the aldehyde used, of zinc thiocyanate, and in the presence of an inert solvent.

7. A process for preparing a beta-lactone which comprises reacting at a temperature of from —40° C. to 50° C. a ketene having the formula:

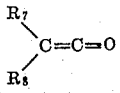

wherein $R_7$ and $R_8$ each represents a member selected from the group consisting of a hydrogen atom, a methyl group, an ethyl group, and a phenyl ($C_6H_5$) group, with an aldehyde represented by the formula:

wherein R represents an alkyl group of the formula $C_nH_{2n+1}$ where $n$ is a positive integer of 1 to 4, in the presence of from 0.01% to 2% by weight, based on the aldehyde used, of zinc thiocyanate, and in the presence of a beta-lactone which corresponds to the lactone being formed.

8. A process for preparing a beta-lactone which comprises reacting at a temperature of from —40° C. to 50° C. a ketene having the formula:

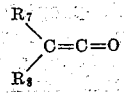

wherein $R_7$ and $R_8$ each represents a member selected from the group consisting of a hydrogen atom, a methyl group, an ethyl group, and a phenyl ($C_6H_5$—) group, with a ketone represented by the formula:

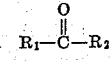

wherein $R_1$ and $R_2$ each represents a member selected from the group consisting of an alkyl group of the formula $C_nH_{2n+1}$ wherein $n$ is a positive integer from 1 to 4, a benzyl group, a beta-phenylethyl group, and a phenyl ($C_6H_5$—) group, in the presence of zinc thiocyanate.

9. A process for preparing a beta-lactone which comprises reacting at a temperature of from —40° C. to 50° C. a ketene having the formula:

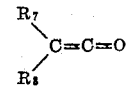

wherein $R_7$ and $R_8$ each represents a member selected from the group consisting of a hydrogen atom, a methyl group, an ethyl group, and a phenyl ($C_6H_5$—) group, with a ketone represented by the formula:

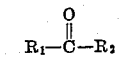

wherein $R_1$ and $R_2$ each represents a member selected from the group consisting of an alkyl group of the formula $C_nH_{2n+1}$ wherein $n$ is a positive integer from 1 to 4, a benzyl group, a beta-phenylethyl group, and a phenyl ($C_6H_5$—) group, in the presence of from 0.01% to 2% by weight, based on the ketone, of zinc thiocyanate, and in the presence of an inert solvent.

10. A process for preparing a beta-lactone which comprises reacting at a temperature of from −40° C. to 50° C. ketene ($CH_2=C=O$) with a ketone represented by the formula:

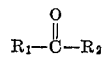

wherein $R_1$ and $R_2$ each represents a member selected from the group consisting of an alkyl group of the formula $C_nH_{2n+1}$ wherein $n$ is a positive integer from 1 to 4, a benzyl group, a beta-phenylethyl group, and a phenyl ($C_6H_5$—) group, in the presence of from 0.01% to 2% by weight, based on the ketone, of zinc thiocyanate, and in the presence of an inert solvent.

11. A process for preparing beta-propiolactone which comprises reacting at a temperature of from −40° C. to +50° C. ketene with formaldehyde in the presence of from 0.01% to 2% by weight based on the formaldehyde used of a catalyst consisting essentially of zinc thiocyanate.

12. A process for preparing beta-propiolactone which comprises reacting ketene with formaldehyde in the presence of from 0.01% to 2% by weight based on the formaldehyde used of a catalyst consisting essentially of zinc thiocyanate, at a temperature of from −40° C. to +50° C. in the presence of an inert solvent.

13. A process for preparing beta-propiolactone which comprises reacting ketene with formaldehyde in the presence of from 0.01% to 2% by weight based on the formaldehyde used of a catalyst consisting essentially of zinc thiocyanate, at a temperature of from −40° C. to +50° C. in the presence of beta-propiolactone as a solvent.

14. A process for preparing beta-propiolactone which comprises forming a gaseous mixture of ketene and monomeric formaldehyde, and passing this gaseous mixture into a solution containing 0.01% to 2% by weight based on the amount of formaldehyde of zinc thiocyanate catalyst dissolved in beta-propiolactone, and continuing the passage of the gaseous mixture of formaldehyde and ketene into the reaction mixture until a substantial portion of the formaldehyde is converted into beta-propiolactone while maintaining the temperature at from −40° C. to +50° C. during the reaction, thereafter neutralizing the catalyst with an aqueous solution of a weak base, and separating the formed lactone from the crude reaction mixture.

15. A process for preparing beta-butyrolactone which comprises reacting at a temperature of from −40° C. to +50° C. ketene with acetaldehyde in the presence of from 0.01% to 2% by weight based in the acetaldehyde of a catalyst consisting essentially of zinc thiocyanate.

16. A process for preparing beta-butyrolactone which comprises reacting ketene with acetaldehyde in the presence of from 0.01% to 2% by weight based on the acetaldehyde of a catalyst consisting essentially of zinc thiocyanate, at a temperature of from −40° C. to +50° C. and in the presence of an inert solvent.

17. A process for making beta-butyrolactone which comprises forming a gaseous mixture of ketene and monomeric acetaldehyde in substantially equimolar ratios, and passing this mixture into a stirred solution containing from 0.01% to 2% by weight based on the amount of acetaldehyde used of zinc thiocyanate catalyst, continuing passage of this mixture until substantially all the acetaldehyde has been converted into beta-butyrolactone while maintaining the temperature at from −40° C. to +50° C. during the reaction, thereafter neutralizing the catalyst with an aqueous solution of a weak alkali, and separating the beta-butyrolactone from the crude reaction mixture.

18. A process for preparing a beta-lactone which comprises reacting, at a temperature of from −40° C. to 50° C., ketene ($CH_2=C=O$) with acetone in the presence of from 0.01% to 2% by weight, based on the acetone used, of zinc thiocyanate.

19. A process for preparing a beta-lactone which comprises reacting, at a temperature of from −40° C. to 50° C., ketene ($CH_2=C=O$) with acetone in the presence of from 0.01% to 2% by weight, based on the acetone used, of zinc thiocyanate, and in the presence of an inert solvent.

20. A process for preparing beta-lactones which comprises reacting ketene ($CH_2=C=O$) with an aldehyde represented by the formula:

wherein R represents an alkyl group of the formula $C_nH_{2n+1}$ where $n$ is a positive integer of 1 to 4, in the presence of from 0.01% to 2% by weight, based on the aldehyde used, of zinc thiocyanate, at a temperature of from −40° C. to +50° C., in the presence of an inert solvent.

JOHN R. CALDWELL.

No references cited.